US012246605B2

United States Patent
Liu et al.

(10) Patent No.: US 12,246,605 B2
(45) Date of Patent: Mar. 11, 2025

(54) CONFIGURABLE DYNAMIC WIRELESS POWER TRANSFER TRANSMISSION SYSTEM

(71) Applicant: Toyota Motor Engineering & Manufacturing North America, Inc., Plano, TX (US)

(72) Inventors: Yanghe Liu, Ann Arbor, MI (US); Shailesh N. Joshi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 534 days.

(21) Appl. No.: 17/587,635

(22) Filed: Jan. 28, 2022

(65) Prior Publication Data
US 2023/0241987 A1 Aug. 3, 2023

(51) Int. Cl.
*B60L 53/122* (2019.01)
*B60L 53/30* (2019.01)
*B60L 53/62* (2019.01)
*B60L 53/66* (2019.01)
*B64C 39/02* (2023.01)
*H02J 50/80* (2016.01)

(52) U.S. Cl.
CPC .......... *B60L 53/122* (2019.02); *B60L 53/305* (2019.02); *B60L 53/62* (2019.02); *B60L 53/66* (2019.02); *H02J 50/80* (2016.02); *B64C 39/024* (2013.01)

(58) Field of Classification Search
CPC .......... B60L 53/122; B60L 53/66; H02J 50/80
USPC ....................................................... 320/109
See application file for complete search history.

(56) References Cited

U.S. PATENT DOCUMENTS

| 9,551,989 | B2 | 1/2017 | Scarlatti et al. |
| 9,873,408 | B2 | 1/2018 | Capizzo |
| 10,023,057 | B2 | 7/2018 | Sobota Rodriguez |
| 10,099,561 | B1 | 10/2018 | Ananthanarayanan et al. |

(Continued)

OTHER PUBLICATIONS

Mou et al., "Energy Efficient and Adaptive Design for Wireless Power Transfer in Electric Vehicles," in IEEE Transactions on Industrial Electronics, vol. 64, No. 9, 2017, pp. 7250-7260.

(Continued)

*Primary Examiner* — Jack Chiang
*Assistant Examiner* — Suchin Parihar
(74) *Attorney, Agent, or Firm* — Christopher G. Darrow; Darrow Mustafa PC

(57) ABSTRACT

A dynamic wireless power transfer system can include a dynamic wireless power transfer transmission system and a dynamic wireless power transfer reception system. The dynamic wireless power transfer transmission system can include a signal receiver, an array of coils of conductors, an array of switches, and a controller. The dynamic wireless power transfer reception system can include a signal transmitter and an array of coils of conductors. The signal transmitter can be configured to transmit, to the signal receiver, a signal. The signal can include information indicative of a size of the array of coils of conductors of the dynamic wireless power transfer reception system. The array of switches can be configured to connect an alternating current source to the array of coils of conductors of the dynamic wireless power transfer transmission system. The controller can control, according to the information, positions of switches of the array of switches.

20 Claims, 3 Drawing Sheets

(56) References Cited

U.S. PATENT DOCUMENTS

| | | | |
|---|---|---|---|
| 11,329,511 B2* | 5/2022 | Partovi | H02J 7/0013 |
| 2014/0015344 A1* | 1/2014 | Mohamadi | H02J 50/27 |
| | | | 307/149 |
| 2017/0244270 A1 | 8/2017 | Waters | |
| 2019/0097465 A1* | 3/2019 | Zeine | H02J 7/00034 |
| 2019/0308514 A1 | 10/2019 | Parimi et al. | |
| 2021/0150458 A1* | 5/2021 | Robinson | G06Q 10/083 |
| 2021/0408827 A1* | 12/2021 | Partovi | H02J 7/0013 |
| 2023/0344505 A1* | 10/2023 | Kim | H04W 56/0015 |

OTHER PUBLICATIONS

Al-Saadi et al., "A New Analytical Formula for Coupling Capacitance of Unipolar Capacitive Coupler in Wireless Power Transfer System," 2019 11th International Symposium on Advanced Topics in Electrical Engineering (ATEE), pp. 1-6.

Zhou et al., "Dynamic Wireless Power Transfer System for Electric Vehicles Employing Multiplexing LCC Modules with Individual Transmitters," IEEE Access, vol. 6, 2018, pp. 62514-62527.

* cited by examiner

CONFIGURABLE DYNAMIC WIRELESS POWER TRANSFER TRANSMISSION SYSTEM

TECHNICAL FIELD

The disclosed technologies are directed to a configurable dynamic wireless power transfer transmission system.

BACKGROUND

Dynamic wireless power transfer (DWPT) technology can be used to recharge a battery in a manner that does not require the battery to be connected by wires to an alternating current power source. A DWPT system can include, for example, a DWPT transmission system and a DWPT reception system. The DWPT transmission system can include, for example, one or more coils of conductors configured to be connected to an alternating current source. The DWPT reception system can include, for example, one or more coils of conductors configured to be connected to a battery via a rectifier. The one or more coils of conductors of the DWPT transmission system can be configured to conduct an alternating current, from the alternating current source, to produce a varying magnetic field. The varying magnetic field can cause an alternating current to be produced in the one or more coils of conductors of the DWPT reception system. The rectifier can be configured to convert the alternating current to a direct current. The direct current can charge the battery.

SUMMARY

In an embodiment, a dynamic wireless power transfer transmission system can include a signal receiver, an array of coils of conductors, an array of switches, and a controller. The signal receiver can be configured to receive, from a dynamic wireless power transfer reception system, a signal. The signal can include information. The information can be indicative of a size of an array of coils of conductors of the dynamic wireless power transfer reception system. The array of switches can be configured to connect an alternating current source to the array of coils of conductors of the dynamic wireless power transfer transmission system. The controller can be configured to control, according to the information, positions of switches of the array of switches.

In another embodiment, a dynamic wireless power transfer reception system can include an array of coils of conductors and a signal transmitter. The array of coils of conductors can be configured to be connected to a battery. The signal transmitter can be configured to transmit, to a dynamic wireless power transfer transmission system, a signal. The signal can include information. The information can be indicative of a size of the array of coils of conductors of the dynamic wireless power transfer reception system.

In another embodiment, a dynamic wireless power transfer transmission system controller can include first circuitry and second circuitry. The first circuitry can be configured to receive, from a dynamic wireless power transfer reception system, a signal. The signal can include information. The information can be indicative of a size of an array of coils of conductors of the dynamic wireless power transfer reception system. The second circuitry can be configured to control, according to the information, positions of switches of an array of switches of a dynamic wireless power transfer transmission system. The dynamic wireless power transfer transmission system can have an array of coils of conductors.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to a configurable dynamic wireless power transfer (DWPT) transmission system. A DWPT system can include, for example, a DWPT transmission system and a DWPT reception system. The DWPT transmission system can include, for example, a signal receiver, an array of coils of conductors, an array of switches, and a controller. For example, a first coil of a conductor of the array of coils of conductors of the DWPT transmission system can be interchangeable with a second coil of a conductor of the array of coils of conductors of the DWPT transmission system. In this manner, a size of the array of coils of conductors of the DWPT transmission system can be a function of a size of a coil of a conductor of the array of coils of conductors. The signal receiver can be configured to receive, from the DWPT reception system, a signal. The signal can include information. The information can be indicative of a size of an array of coils of conductors of the DWPT reception system. For example, a first coil of a conductor of the array of coils of conductors of the DWPT reception system can be interchangeable with a second coil of a conductor of the array of coils of conductors of the DWPT reception system. In this manner, a size of the array of coils of conductors of the DWPT reception system can be a function of a size of a coil of a conductor of the array of coils of conductors.

The array of switches can be configured to connect an alternating current source to the array of coils of conductors of the DWPT transmission system. The controller can be configured to control, according to the information, positions of switches of the array of switches. For example, the controller can be configured to cause the positions of the switches, associated with a set of coils of conductors of the array of coils of conductors of the DWPT transmission system, to be closed positions. For example, a location of the set of coils of conductors, of the array of coils of conductors of the DWPT transmission system, can face a location of the array of coils of conductors of the DWPT reception system. Having the positions of the switches only associated with the set of coils of conductors closed, rather than all of the switches of the array of switches, can improve a power transfer efficiency of the DWPT system. Moreover, having the positions of the switches associated with the set of coils of conductors immediately positioned according to the information in the signal received from the DWPT reception system, rather than positioned in response to a result produced (with an associated delay) from a determination of information received from one or more sensors of the DWPT transmission system, can improve an operational efficiency of the DWPT system.

Figure 1:
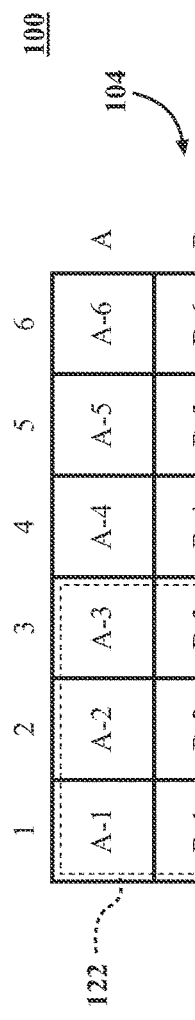
FIG. 1 includes diagrams that illustrate an example of a dynamic wireless power transfer transmission system, according to the disclosed technologies.
Figure 1:
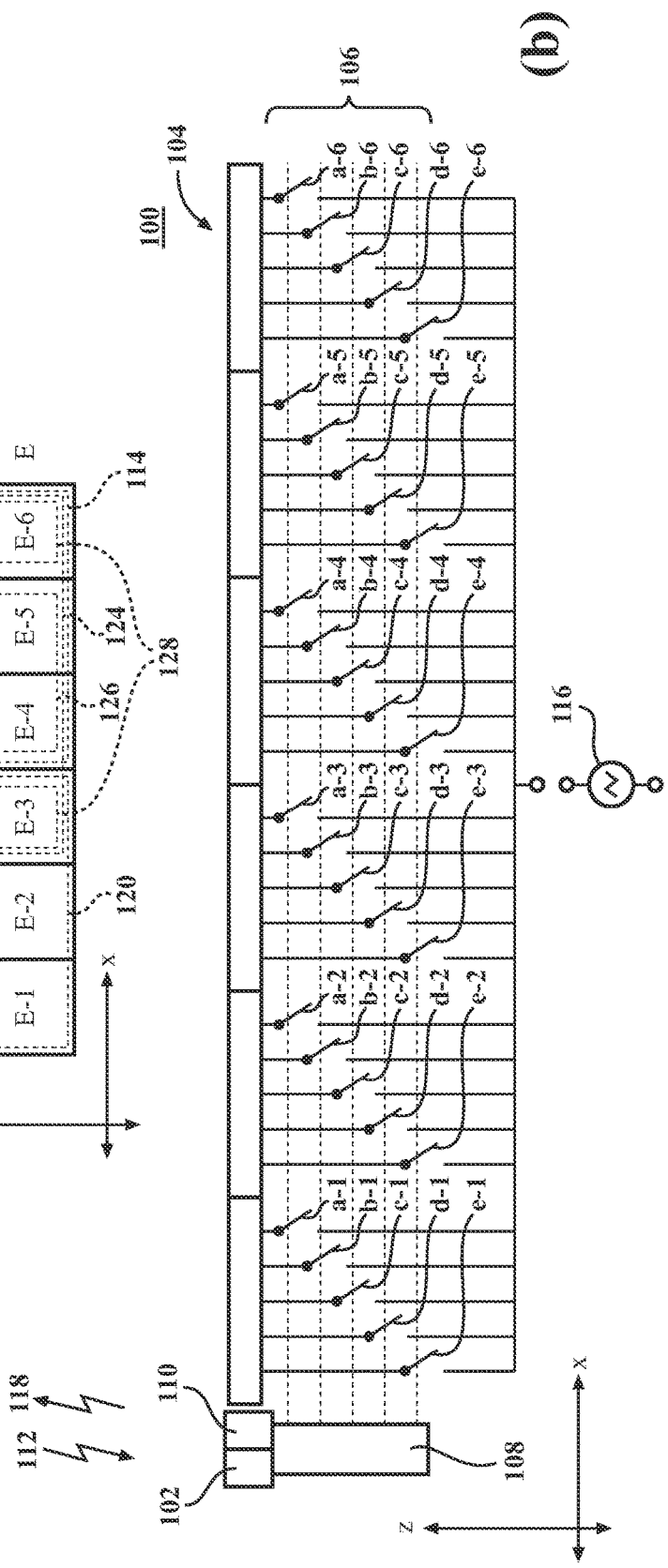

FIG. 1 includes diagrams that illustrate an example of a dynamic wireless power transfer (DWPT) transmission system 100, according to the disclosed technologies. A view (a) of FIG. 1 is a diagram that illustrates the example of the DWPT transmission system 100 from a perspective of an x-y coordinate system. A view (b) of FIG. 1 is a diagram that illustrates the example of the DWPT transmission system 100 from a perspective of an x-z coordinate system. The DWPT transmission system 100 can include, for example, a signal receiver 102, an array 104 of coils of conductors, an array 106 of switches, and a controller 108. Additionally, for example, the DWPT transmission system 100 can include a signal transmitter 110.

The signal receiver 102 can be configured to receive, from a DWPT reception system (e.g., a DWPT reception system 200 illustrated at FIG. 2 or a DWPT reception system 300 illustrated at FIG. 3), a signal 112. The signal 112 can include information. The information can be indicative of a size of an array of coils of conductors of the DWPT reception system. Additionally, for example, the information can be further indicative of a state of charge of a battery associated with the DWPT reception system, a shape of the array of coils of conductors of the DWPT reception system, a location of the array of coils of conductors of the DWPT reception system, or the like. The location of the array of coils of conductors of the DWPT reception system can be facing a location of a set 114 of coils of conductors included in the array 104 of coils of conductors of the DWPT transmission system 100.

The array 104 of coils of conductors can include, for example, five rows of coils of conductors: A, B, C, D, and E. Each of the five rows of coils of conductors can include, for example, six columns: 1, 2, 3, 4, 5, and 6. For example, the array 104 of coils of conductors can include: A-1, A-2, A-3, A-4, A-5, A-6, B-1, B-2, B-3, B-4, B-5, B-6, C-1, C-2, C-3, C-4, C-5, C-6, D-1, D-2, D-3, D-4, D-5, D-6, E-1, E-2, E-3, E-4, E-5, and E-6.

For example, a first coil of a conductor of the array 104 of coils of conductors can be interchangeable with a second coil of a conductor of the array 104 of coils of conductors. In this manner, a size of the array 104 of coils of conductors can be a function of a size of a coil of a conductor of the array 104 of coils of conductors. For example, a first coil of a conductor of the array 104 of coils of conductors can be configured to be connected to an alternating current source 116 in parallel with a second coil of a conductor of the array 104 of coils of conductors. In this manner, the DWPT transmission system 100 can be configured to remain in operation in an event in which a coil of a conductor, of the array 104 of coils of conductors, becomes inoperable.

The array 106 of switches can be configured to connect the alternating current source 116 to the array 104 of coils of conductors. For example, each coil of a conductor, of the array 104 of coils of conductors, can be associated with a corresponding switch of the array 106 of switches. For example, the array 106 of switches can include: a-1, a-2, a-3, a-4, a-5, a-6, b-1, b-2, b-3, b-4, b-5, b-6, c-1, c-2, c-3, c-4, c-5, c-6, d-1, d-2, d-3, d-4, d-5, d-6, e-1, e-2, e-3, e-4, e-5, and e-6.

The controller 108 can be configured to control, according to the information included in the signal 112, positions of switches of the array 106 of switches.

Figure 2:
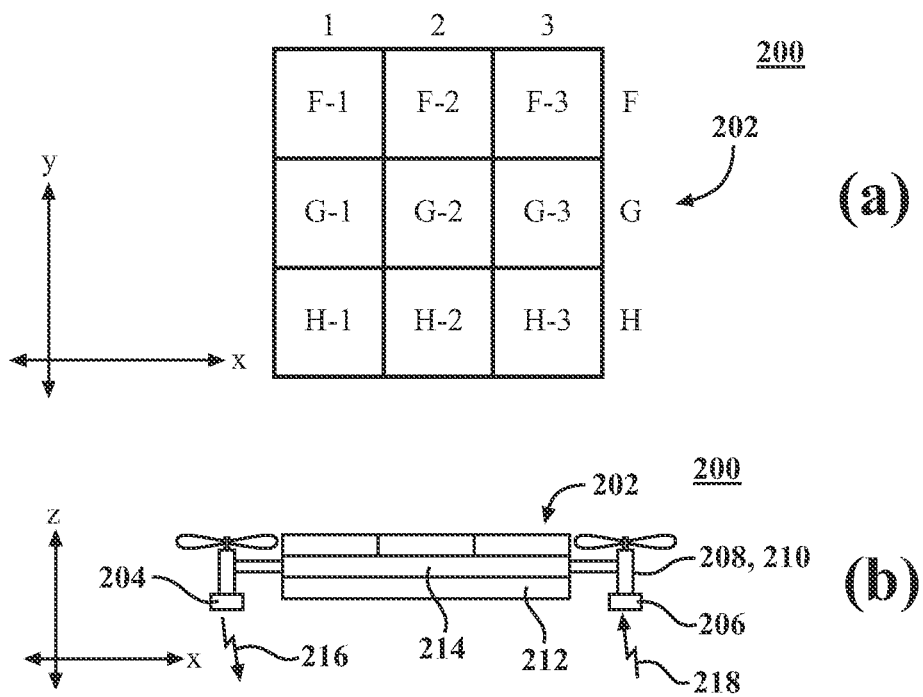
FIG. 2 includes diagrams that illustrate a first example of the dynamic wireless power transfer reception system, according to the disclosed technologies.

FIG. 2 includes diagrams that illustrate a first example of the dynamic wireless power transfer (DWPT) reception system 200, according to the disclosed technologies. A view (a) of FIG. 2 is a diagram that illustrates the example of the DWPT reception system 200 from a perspective of the x-y coordinate system. A view (b) of FIG. 2 is a diagram that illustrates the example of the DWPT reception system 200 from a perspective of the x-z coordinate system. The DWPT reception system 200 can include, for example, an array 202 of coils of conductors and a signal transmitter 204. Additionally, for example, the DWPT reception system 200 can include a signal receiver 206. For example, the DWPT reception system 200 can be disposed on a vehicle 208. For example, the vehicle 208 can be autonomous. Additionally or alternatively, for example, the vehicle 208 can include a vertical take-off and landing (VTOL) aircraft 210.

The array 202 of coils of conductors can be configured to be connected to a battery 212. For example, the array 202 of coils of conductors can be configured to be connected to the battery 212 via a rectifier 214. The array 202 of coils of conductors can include, for example, three rows of coils of conductors: F, G, and H. Each of the three rows of coils of conductors can include, for example, three columns: 1, 2, and 3. For example, the array 202 of coils of conductors can include: F-1, F-2, F-3, G-1, G-2, G-3, H-1, H-2, and H-3.

For example, a first coil of a conductor of the array 202 of coils of conductors can be interchangeable with a second coil of a conductor of the array 202 of coils of conductors. In this manner, a size of the array 202 of coils of conductors can be a function of a size of a coil of a conductor of the array 202 of coils of conductors. For example, a first coil of a conductor of the array 202 of coils of conductors can be connected in parallel with a second coil of a conductor of the array 202 of coils of conductors. In this manner, the DWPT reception system 200 can be configured to remain in operation in an event in which a coil of a conductor, of the array 202 of coils of conductors, becomes inoperable.

The signal transmitter 204 can be configured to transmit, to a DWPT transmission system (e.g., the DWPT transmission system 100 illustrated at FIG. 1), a signal 216. The signal 216 can include information. The information can be indicative of a size of the array 202 of coils of conductors. Additionally, for example, the information can be further indicative of a state of charge of the battery 212, a shape of the array 202 of coils of conductors, a location of the array 202 of coils of conductors, or the like. The location of the array 202 of coils of conductors can be facing a location of a set of coils of conductors included in an array of coils of conductors of the DWPT transmission system.

Figure 3:
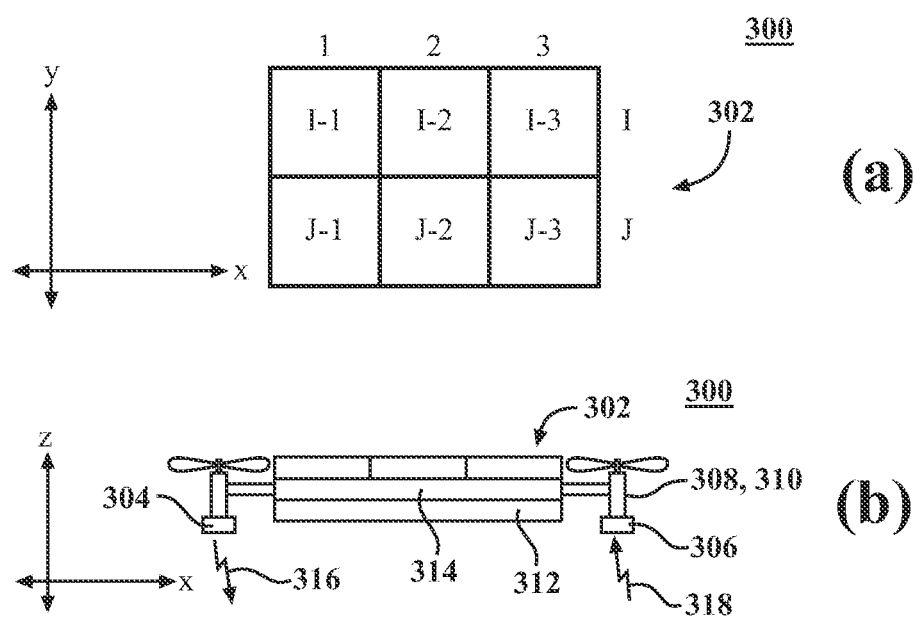
FIG. 3 includes diagrams that illustrate a second example of the dynamic wireless power transfer reception system, according to the disclosed technologies.

FIG. 3 includes diagrams that illustrate a second example of the dynamic wireless power transfer (DWPT) reception system 300, according to the disclosed technologies. A view (a) of FIG. 3 is a diagram that illustrates the example of the DWPT reception system 300 from a perspective of the x-y coordinate system. A view (b) of FIG. 3 is a diagram that illustrates the example of the DWPT reception system 300 from a perspective of the x-z coordinate system. The DWPT reception system 300 can include, for example, an array 302 of coils of conductors and a signal transmitter 304. Additionally, for example, the DWPT reception system 300 can include a signal receiver 306. For example, the DWPT reception system 300 can be disposed on a vehicle 308. For example, the vehicle 308 can be autonomous. Additionally or alternatively, for example, the vehicle 308 can include a vertical take-off and landing (VTOL) aircraft 310.

The array 302 of coils of conductors can be configured to be connected to a battery 312. For example, the array 302 of coils of conductors can be configured to be connected to the battery 312 via a rectifier 314. The array 302 of coils of conductors can include, for example, two rows of coils of conductors: I and J. Each of the two rows of coils of conductors can include, for example, three columns: 1, 2, and 3. For example, the array 302 of coils of conductors can include: I-1, 1-2, 1-3, J-1, J-2, and J-3.

For example, a first coil of a conductor of the array 302 of coils of conductors can be interchangeable with a second coil of a conductor of the array 302 of coils of conductors. In this manner, a size of the array 302 of coils of conductors can be a function of a size of a coil of a conductor of the array 302 of coils of conductors. For example, a first coil of a conductor of the array 302 of coils of conductors can be connected in parallel with a second coil of a conductor of the array 302 of coils of conductors. In this manner, the DWPT reception system 300 can be configured to remain in operation in an event in which a coil of a conductor, of the array 302 of coils of conductors, becomes inoperable.

The signal transmitter 304 can be configured to transmit, to a DWPT transmission system (e.g., the DWPT transmission system 100 illustrated at FIG. 1), a signal 316. The signal 316 can include information. The information can be indicative of a size of the array 302 of coils of conductors. Additionally, for example, the information can be further indicative of a state of charge of the battery 312, a shape of the array 302 of coils of conductors, a location of the array 302 of coils of conductors, or the like. The location of the array 302 of coils of conductors can be facing a location of a set of coils of conductors included in an array of coils of conductors of the DWPT transmission system.

Returning to FIGS. 1 and 2, in a configuration, for example, the information included in the signal 112 received by the signal receiver 102 of the DWPT transmission system 100 (which can be the information included in the signal 216 transmitted by the signal transmitter 204 of the DWPT reception system 200) can also be indicative of a location of the array 202 of coils of conductors of the DWPT reception system 200. The location of the array 202 of coils of conductors can be facing a location of the set 114 of coils of conductors included in the array 104 of coils of conductors of the DWPT transmission system 100. For example, the set 114 of coils of conductors can include: C-4, C-5, C-6, D-4, D-5, D-6, E-4, E-5, and E-6.

In a variation of this configuration, for example, the DWPT transmission system 100 can include the signal transmitter 110. The signal transmitter 110 can be configured to transmit, to the DWPT reception system 200, a signal 118. The signal 118 can include information. The information can be indicative of the location of the set 114 of coils of conductors.

In this variation, for example, the DWPT reception system 200 can include the signal receiver 206. The signal receiver 206 can be configured to receive, from the DWPT transmission system 100, a signal 218. The signal 218 can include information. The information can be indicative of the location of the set 114 of coils of conductors.

That is, the information in the signal 118 transmitted by the signal transmitter 110 of the DWPT transmission system 100 can be the information in the signal 218 received by the signal receiver 206 of the DWPT reception system 200.

For example, a transmission of the signal 118 transmitted by the signal transmitter 110 of the DWPT transmission system 100 (and received, as the signal 218, by the signal receiver 206 of the DWPT reception system 200) can be before a transmission of the signal 216 transmitted by the signal transmitter 204 of the DWPT reception system 200 (and received, as the signal 112, by the signal receiver 102 of the DWPT transmission system 100). That is, the information in the signal 118 transmitted by the signal transmitter 110 of the DWPT transmission system 100 can be used, for example, by the DWPT reception system 200 to move so that the location of the array 202 of coils of conductors can be facing the location of the set 114 of coils of conductors.

In another variation of this configuration, for example, the DWPT transmission system 100 can include the signal transmitter 110. The signal transmitter 110 can be configured to transmit, to the DWPT reception system 200, the signal 118. The signal 118 can include information and a request. The information can be indicative of the location of a set 120 of coils of conductors included in the array 104 of coils of conductors of the DWPT transmission system 100. For example, the set 120 of coils of conductors can include: C-1, C-2, C-3, D-1, D-2, D-3, E-1, E-2, and E-3. The request can be for the DWPT reception system 200 to move from the location of the array 202 of coils of conductors, facing the location of the set 114 of coils of conductors, to another location, the other location being facing the location of the set 120 of coils of conductors.

In this variation, for example, the DWPT reception system 200 can include the signal receiver 206. The signal receiver 206 can be configured to receive, from the transmission system 100, the signal 218. The signal 218 can include information and a request. The information can be indicative of a location of the set 120 of coils of conductors included in the array 104 of coils of conductors. The request can be for the DWPT reception system 200 to move from the location of the array 202 of coils of conductors, facing the location of the set 114 of coils of conductors, to another location, the other location being facing the location of the set 120 of coils of conductors.

That is: (1) the information in the signal 118 transmitted by the signal transmitter 110 of the DWPT transmission system 100 can be the information in the signal 218 received by the signal receiver 206 of the DWPT reception system 200 and (2) the request in the signal 118 transmitted by the signal transmitter 110 of the DWPT transmission system 100 can be the request in the signal 218 received by the signal receiver 206 of the DWPT reception system 200.

For example, a transmission of the signal 216 transmitted by the signal transmitter 204 of the DWPT reception system 200 (and received, as the signal 112, by the signal receiver 102 of the DWPT transmission system 100) can be before a transmission of the signal 118 transmitted by the signal transmitter 110 of the DWPT transmission system 100 (and received, as the signal 218, by the signal receiver 206 of the DWPT reception system 200). That is, in response to the information in the signal 216 transmitted by the signal transmitter 204 of the DWPT reception system 200 (and received, as the signal 112, by the signal receiver 102 of the DWPT transmission system 100), the signal transmitter 110 of the DWPT transmission system 100 can transmit the signal 118. The information and the request in the signal 118, received, as the signal 218, by the signal receiver 206 of the DWPT reception system 200 can be used, for example, by the DWPT reception system 200 so that the location of the array 202 of coils of conductors can move from being facing the location of the set 114 of coils of conductors to being facing the location of the set 120 of coils of conductors. For example, the set 114 of coils of conductors may be unavailable. Additionally or alternatively, for example, one or more of the coils of conductors of the set 114 of coils of conductors may be inoperable or may be able to operate in a degraded manner.

With reference to FIGS. 1-3, in yet another variation of this configuration, for example, the signal receiver 102 can be configured to receive, from the DWPT reception system 300, the signal 316. The signal 316 can include information. The information can be indicative of: (1) a size of the array 302 of coils of conductors disposed on the DWPT reception system 300 and (2) a location of the array 302 of coils of conductors. The location of the array 302 of coils of conductors can be facing a location of a set a of coils of conductors included in the array 104 of coils of conductors of the DWPT transmission system 100. For example, the set 122 of coils of conductors can include: A-1, A-2, A-3, B-1, B-2, and B-3. In this manner, the DWPT transmission system 100 can be configured to recharge contemporaneously the battery 212 (connected to the DWPT reception system 200) and the battery 312 (connected to the DWPT reception system 300).

Returning to FIGS. 1 and 2, in still another variation of this configuration, for example, a set 124 of coils of conductors included in the array 104 of coils of conductors of the DWPT transmission system 100 can include: C-3, C-4, C-5, C-6, D-3, D-4, D-5, D-6, E-3, E-4, E-5, and E-6. For example, in a situation in which there can be a misalignment between the coils of conductors included in the array 104 of coils of conductors of the DWPT transmission system 100 and the coils of conductors included in the array 202 of coils of conductors of the DWPT reception system 200, the location of the array 202 of coils of conductors can be facing a location of the set 124 of coils of conductors rather than the location of the set 114 of coils of conductors. The controller 108 can be configured to cause the positions of the switches associated with the set 124 of coils of conductors to be closed positions.

Additionally, for example, the controller 108 can be further configured to define the set 124 of coils of conductors to include a first subset 126 of coils of conductors and a second subset 128 of coils of conductors. The first subset 126 of coils of conductors can include the coils of conductors that are completely overlapped by the array 202 of coils of conductors of the DWPT reception system 200. The second subset 128 of coils of conductors can include the coils of conductors that have a degree of overlap, by the array 202 of coils of conductors of the DWPT reception system 200, that is greater than a first threshold degree, but less than completely overlapped. For example, the first subset 126 of coils of conductors can include: C-4, C-5, D-4, D-5, E-4, and E-5. For example, the first subset 128 of coils of conductors can include: C-3, C-6, D-3, D-6, E-3, and E-6.

Additionally, for example, the controller 108 can be further configured to control an amount of current conveyed through each of the coils of conductors in the set 124 of coils of conductors. For example, the alternating current source 116 can be an array of variable alternating current sources in which each variable alternating current source can be connected to a corresponding switch of the array 106 of switches. Additionally or alternatively, for example, one or more of a line that connects the alternating current source 116 to the array 106 of switches or a line that connects the array 106 of switches to the array 104 of coils of conductors can include a variable resistor.

For example, the controller 108 can be configured to limit the amount of current conveyed through a coil of a conductor in the set 124 of coils of conductors to prevent the coil from overheating.

For example, the controller 108 can be configured to control the amount of current conveyed through each of the coils of conductors in the set 124 of coils of conductors so that a transfer of power to the array 202 of coils of conductors is uniform. For example, the controller 108 can be configured so that the amount of current conveyed through the second subset 128 of coils of conductors is greater than the amount of current conveyed through the first subset 126 of coils of conductors. Alternatively, for example, the controller 108 can be configured to control the amount of current conveyed through one or more of the first subset 126 of coils of conductors or the second subset 128 of coils of conductors so that no current can be conveyed through a coil of a conductor in the one or more of the first subset 126 of coils of conductors or the second subset 128 of coils of conductors unless the degree of overlap, by the array 202 of coils of conductors of the DWPT reception system 200, is greater than a second threshold degree. For example, if: (1) the degree of overlap associated with C-3, D-3, and E-3 is forty percent, (2) the degree of overlap associated with C-6, D-6, and E-6 is sixty percent, and (3) the second threshold degree is forty percent, then no current can be conveyed through C-3, D-3, and E-3.

Figure 4:
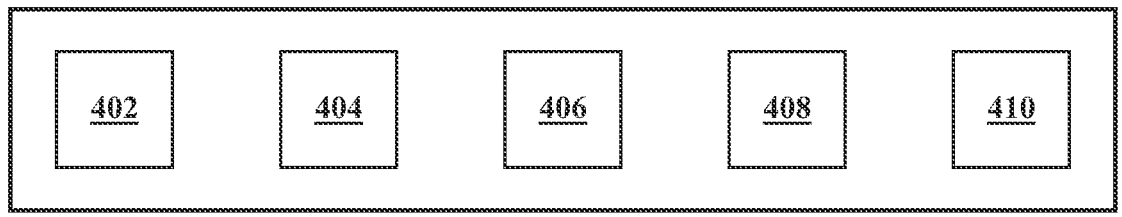
FIG. 4 includes a diagram that illustrate an example of a dynamic wireless power transfer transmission system controller, according to the disclosed technologies.

FIG. 4 includes a diagram that illustrate an example of a dynamic wireless power transfer (DWPT) transmission system controller 400, according to the disclosed technologies. The DWPT transmission system controller 400 can include, for example, first circuitry 402 and second circuitry 404. For example, the controller 400 can be the controller 108 illustrated at FIG. 1.

The first circuitry 402 can be configured to receive, from a DWPT reception system, a first signal. The first signal can include first information. The first information can be indicative of a size of an array of coils of conductors of the DWPT reception system. Additionally, for example, the first information can be further indicative of a state of charge of a battery associated with the DWPT reception system, a shape of the array of coils of conductors of the DWPT reception system, a location of the array of coils of conductors of the DWPT reception system, or the like. The location of the array of coils of conductors of the DWPT reception system can be facing a location of a first set of coils of conductors included in the array of coils of conductors of the DWPT transmission system.

The second circuitry 404 can be configured to control, according to the first information, positions of switches of an array of switches of a DWPT transmission system. The DWPT transmission system can have an array of coils of conductors.

In a configuration, for example, the first information included in the first signal, received from the DWPT reception system, can also be indicative of a location of the array of coils of conductors of the DWPT reception system. The location of the array of coils of conductors of the DWPT reception system can be facing a location of the first set of coils of conductors included in the array of coils of conductors of the DWPT transmission system.

In a variation of this configuration, for example, the DWPT transmission system controller 400 can include third circuitry 406. The third circuitry 406 can be configured to cause a second signal be transmitted to the DWPT reception system. The second signal can include second information. The second information can be indicative of the location of the set of coils of conductors included in the array of coils of conductors of the DWPT transmission system.

In another variation of this configuration, for example, the DWPT transmission system controller 400 can include the third circuitry 406. The third circuitry 406 can be configured to cause to the second signal be transmitted to the DWPT reception system. The second signal can include the second information and a request. The second information can be indicative of the location of a second set of coils of conductors included in the array of coils of conductors of the DWPT transmission system. The request can be for the DWPT reception system to move from the location of the array of coils of conductors of the DWPT reception system, facing the location of the first set of coils of conductors included in the array of coils of conductors of the DWPT transmission system, to another location, the other location being facing the location of the second set of coils of conductors included in the array of coils of conductors of the DWPT transmission system.

In yet another variation of this configuration, for example, the first circuitry 402 can be configured to receive, from another DWPT reception system, a third signal. The third signal can include third information. The third information can be indicative of: (1) a size of an array of coils of conductors disposed on the other DWPT reception system and (2) a location of the array of coils of conductors disposed on the other DWPT reception system. The location of the array of coils of conductors disposed on the other DWPT reception system can be facing a location of a third set of coils of conductors included in the array of coils of conductors of the DWPT transmission system.

In still another variation of this configuration, for example, a fourth set of coils of conductors included in the array of coils of conductors of the DWPT transmission system can include the first set of coils of conductors included in the array of coils of conductors of the DWPT transmission system and additional coils of conductors. The second circuitry 404 can be configured to cause the positions of the switches associated with the fourth set of coils of conductors to be closed positions.

Additionally, for example, the DWPT transmission system controller 400 can include fourth circuitry 408. The fourth circuitry 408 can be configured to define the fourth set of coils of conductors to include a first subset of coils of conductors and a second subset of coils of conductors. The first subset of coils of conductors can include the coils of conductors that are completely overlapped by the array of coils of conductors of the DWPT reception system. The second subset of coils of conductors can include the coils of conductors that have a degree of overlap, by the array of coils of conductors of the DWPT reception system, that is greater than a threshold degree, but less than completely overlapped.

Additionally, for example, the DWPT transmission system controller 400 can include fifth circuitry 410. The fifth circuitry 410 can be configured to control an amount of current conveyed through each of the coils of conductors in the fourth set of coils of conductors included in the array of coils of conductors of the DWPT transmission system. For example, the second circuitry 404 can be configured to control the positions of the switches of the array of switches of the DWPT transmission system so that the fourth set of coils of conductors, included in the array of coils of conductors of the DWPT transmission system, are connected to an alternating current source. For example, the alternating current source can be an array of variable alternating current sources in which each variable alternating current source can be connected to a corresponding switch of the array of switches. Additionally or alternatively, for example, one or more of a line that connects the alternating current source to the array of switches or a line that connects the array of switches to the array of coils of conductors of the DWPT transmission system can include a variable resistor.

For example, the fifth circuitry 410 can be configured to limit the amount of current conveyed through a coil of a conductor in the fourth set of coils of conductors included in the array of coils of conductors of the DWPT transmission system to prevent the coil from overheating.

For example, the fifth circuitry 410 can be configured to control the amount of current conveyed through each of the coils of conductors in the fourth set of coils of conductors included in the array of coils of conductors of the DWPT transmission system so that a transfer of power to the array of coils of conductors of the DWPT reception system is uniform. For example, the fifth circuitry 410 can be configured so that the amount of current conveyed through the second subset of coils of conductors of the fourth set of coils of conductors is greater than the amount of current conveyed through the first subset of coils of conductors of the fourth set of coils of conductors. Alternatively, for example, the fifth circuitry 410 can be configured to control the amount of current conveyed through one or more of the first subset of coils of conductors or the second subset of coils of conductors so that no current can be conveyed through a coil of a conductor in the one or more of the first subset of coils of conductors or the second subset of coils of conductors unless the degree of overlap, by the array of coils of conductors of the DWPT reception system, is greater than a second threshold degree.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A dynamic wireless power transfer transmission system, comprising:
   a signal receiver configured to receive, from a dynamic wireless power transfer reception system, a first signal including first information indicative of a location of a first array of coils of the dynamic wireless power transfer reception system;
   a second array of coils;
   an array of switches configured to connect an alternating current source to the second array of coils; and
   a controller configured to:
      define a first set of coils of the second array of coils to include a first subset and a second subset, the first subset including the coils that are completely overlapped by the first array of coils, the second subset including the coils that have a degree of overlap, by the first array of coils, that is greater than a threshold degree, but less than completely overlapped,
      control, according to the first information, positions of switches of the array of switches, and
      control an amount of current conveyed through the second array of coils so that an amount of current conveyed through the second subset is greater than an amount of current conveyed through the first subset.

2. The dynamic wireless power transfer transmission system of claim 1, wherein a first coil of the second array of coils is interchangeable with a second coil of the second array of coils.

3. The dynamic wireless power transfer transmission system of claim 1, wherein a first coil of a conductor of the second array of coils is configured to be connected to the alternating current source in parallel with a second coil of the second array of coils.

4. The dynamic wireless power transfer transmission system of claim 1, wherein the first information is further indicative of a state of charge of a battery associated with the dynamic wireless power transfer reception system.

5. The dynamic wireless power transfer transmission system of claim 1, wherein the first information is further indicative of a shape of the first array of coils.

6. The dynamic wireless power transfer transmission system of claim 1, wherein the first information is further indicative of a size of the first array of coils.

7. The dynamic wireless power transfer transmission system of claim 1, further comprising a signal transmitter configured to transmit, to the dynamic wireless power transfer reception system, a second signal including second information indicative of the location of the first set of coils.

8. The dynamic wireless power transfer transmission system of claim 1, further comprising a signal transmitter configured to transmit, to the dynamic wireless power transfer reception system, a second signal including a request and second information indicative of a location of a second set of coils of the second array of coils, the request being for the dynamic wireless power transfer reception system to move from the location of the first array of coils coils, facing the location of the first set of coils, to another location, the other location being facing the location of the second set of coils.

9. The dynamic wireless power transfer transmission system of claim 1, wherein the signal receiver is configured to receive, from another dynamic wireless power transfer reception system, a second signal including second information indicative of:
a size of a third array of coils disposed on the other dynamic wireless power transfer reception system, and
a location of the third array of coils, the location of the third array of coils being facing a location of a second set of coils of the second array of coils.

10. The dynamic wireless power transfer transmission system of claim 1, wherein the controller is configured to cause the positions of the switches associated with the first set of coils to be closed positions.

11. The dynamic wireless power transfer transmission system of claim 1, wherein the dynamic wireless power transfer reception system is disposed on a vehicle.

12. The dynamic wireless power transfer transmission system of claim 11, wherein the vehicle is autonomous.

13. The dynamic wireless power transfer transmission system of claim 11, wherein the vehicle comprises a vertical take-off and landing aircraft.

14. The dynamic wireless power transfer transmission system of claim 1, wherein the dynamic wireless power transfer transmission system is configured to remain in operation in an event in which a coil, of the second array of coils, becomes inoperable.

15. The dynamic wireless power transfer transmission system of claim 1, wherein the dynamic wireless power transfer reception system is configured to remain in operation in an event in which a coil, of the first array of coils, becomes inoperable.

16. The dynamic wireless power transfer transmission system of claim 1, wherein the controller is configured to control the amount of current conveyed through each of the coils in the first set of coils so that a transfer of power to the first array of coils is uniform.

17. A dynamic wireless power transfer transmission system controller, comprising:
first circuitry configured to receive, from a dynamic wireless power transfer reception system, a first signal including first information indicative of a location of a first array of coils of the dynamic wireless power transfer reception system;
second circuitry configured to control, according to the first information, positions of switches of an array of switches of a dynamic wireless power transfer transmission system, the dynamic wireless power transfer transmission system having a second array of coils; and
third circuitry configured to define a first set of coils of the second array of coils to include a first subset and a second subset, the first subset including the coils that are completely overlapped by the first array of coils, the second subset including the coils that have a degree of overlap, by the first array of coils, that is greater than a threshold degree, but less than completely overlapped,
wherein the dynamic wireless power transfer transmission system controller is configured to control an amount of current conveyed through the second array of coils so that an amount of current conveyed through the second subset is greater than an amount of current conveyed through the first subset.

18. The dynamic wireless power transfer transmission system controller of claim 17:
wherein the first information is further indicative of a size of the first array of coils, and
further comprising fourth circuitry configured to cause a second signal be transmitted to the dynamic wireless power transfer reception system, the second signal including second information indicative of the location of the first set of coils.

19. The dynamic wireless power transfer transmission system controller of claim 17:
wherein the first information is further indicative of a shape of the first array of coils, and
further comprising fourth circuitry configured to cause a second signal be transmitted to the dynamic wireless power transfer reception system, the second signal including a request and second information indicative of a location of a second set of coils of the second array of coils, the request being for the dynamic wireless power transfer reception system to move from the location of the first array of coils, facing the location of the first set of coils, to another location, the other location being facing the location of the second set of coils.

20. The dynamic wireless power transfer transmission system controller of claim 17:
wherein the location of the first array of coils is facing a location of the first set of coils, and
wherein the second circuitry is configured to cause the positions of the switches associated with the first set of coils to be closed positions.

\* \* \* \* \*